United States Patent
McAlister

(10) Patent No.: US 9,284,191 B2
(45) Date of Patent: Mar. 15, 2016

(54) CARBON-BASED MANUFACTURING OF FIBER AND GRAPHENE MATERIALS

(71) Applicant: McAlister Technologies, LLC, Phoenix, AZ (US)

(72) Inventor: Roy Edward McAlister, Phoenix, AZ (US)

(73) Assignee: McAlister Technologies, LLC, Phoenix, AZ (US)

( * ) Notice: Subject to any disclaimer, the term of this patent is extended or adjusted under 35 U.S.C. 154(b) by 0 days.

(21) Appl. No.: 14/215,945

(22) Filed: Mar. 17, 2014

(65) Prior Publication Data

US 2015/0191354 A1 Jul. 9, 2015

Related U.S. Application Data

(60) Provisional application No. 61/801,522, filed on Mar. 15, 2013.

(51) Int. Cl.
| | |
|---|---|
| *C08F 20/44* | (2006.01) |
| *C08F 210/00* | (2006.01) |
| *C01B 31/02* | (2006.01) |
| *C01B 31/04* | (2006.01) |
| *D01F 9/12* | (2006.01) |

(52) U.S. Cl.
CPC ............ *C01B 31/02* (2013.01); *C01B 31/0446* (2013.01); *D01F 9/12* (2013.01)

(58) Field of Classification Search
CPC .......... C01J 19/12; C01J 19/08; B01D 53/86; H04B 6/08
USPC .................................................. 526/341, 348
See application file for complete search history.

(56) References Cited

U.S. PATENT DOCUMENTS

| | | | |
|---|---|---|---|
| 2,180,626 | A | 11/1939 | Delorme |
| 4,339,546 | A | 7/1982 | Randalls |
| 5,242,296 | A | 9/1993 | Tuson et al. |

(Continued)

FOREIGN PATENT DOCUMENTS

| | | | |
|---|---|---|---|
| JP | 2005-289856 A | 10/2005 | |
| JP | 2007-314745 A | 12/2007 | |

(Continued)

OTHER PUBLICATIONS

"Geologic Sequestration of Carbon Dioxide | UIC | US EPA." US Environmental Protection Agency. Accessed: Aug. 30, 2009. <http://www.epa.gov/safewater/uic/wells_sequestration.html>. pp. 1-5.

(Continued)

*Primary Examiner* — William Cheung
(74) *Attorney, Agent, or Firm* — Perkins Coie LLP

(57) ABSTRACT

Methods, systems, and devices are described to fabricate precursor intermediaries and carbon fiber or graphene materials. In one aspect, a method to fabricate an acryl-modified polymer includes obtaining a hydrocarbon substance from one or both of a waste stream or natural gas, separating gases from the hydrocarbon substance to form hydrogen gas and a carbonaceous gas including one or more of methane, butane, or ethane, dehydrogenating the carbonaceous gas by adding heat to form a dehydrogenated carbon material, and reacting the dehydrogenated carbon material with a nitrogen material including one of ammonia or urea to produce polyacrylonitrile (PAN).

17 Claims, 1 Drawing Sheet

(56) References Cited

U.S. PATENT DOCUMENTS

| | | | |
|---|---|---|---|
| 5,343,699 | A | 9/1994 | McAlister |
| 5,882,484 | A | 3/1999 | Pyy |
| 6,024,032 | A | 2/2000 | Sharpe |
| 6,133,328 | A | 10/2000 | Lightner |
| 6,155,212 | A | 12/2000 | McAlister |
| 6,270,731 | B1 | 8/2001 | Kato et al. |
| 6,446,597 | B1 | 9/2002 | McAlister |
| 6,653,005 | B1 | 11/2003 | Muradov |
| 6,890,419 | B2 | 5/2005 | Reichman et al. |
| 7,033,570 | B2 | 4/2006 | Weimer et al. |
| 7,033,822 | B2 | 4/2006 | Maston |
| 7,132,090 | B2 | 11/2006 | Dziedzic et al. |
| 7,138,046 | B2 | 11/2006 | Roychowdhury |
| 7,169,821 | B2 | 1/2007 | Branson |
| 7,309,435 | B2 | 12/2007 | Rozich |
| 7,425,315 | B2 | 9/2008 | Kruesi |
| 7,482,078 | B2 | 1/2009 | Sridhar et al. |
| 7,491,453 | B2 | 2/2009 | Logan et al. |
| 7,507,341 | B2 | 3/2009 | Gallagher et al. |
| 7,562,708 | B2 | 7/2009 | Cogliandro et al. |
| 7,569,203 | B2 | 8/2009 | Fridman et al. |
| 7,572,369 | B2 | 8/2009 | Gallagher et al. |
| 7,572,530 | B2 | 8/2009 | Gottmann et al. |
| 7,575,822 | B2 | 8/2009 | Mitlitsky et al. |
| 7,591,880 | B2 | 9/2009 | Levan et al. |
| 7,599,760 | B2 | 10/2009 | Dutta et al. |
| 7,608,439 | B2 | 10/2009 | McTavish et al. |
| 7,618,606 | B2 | 11/2009 | Fan et al. |
| 7,628,137 | B1 | 12/2009 | McAlister |
| 7,753,973 | B2 | 7/2010 | Galloway |
| 7,878,131 | B2 | 2/2011 | Becchetti et al. |
| 7,906,559 | B2 | 3/2011 | Olah et al. |
| 7,931,783 | B2 | 4/2011 | Dam-Johansen et al. |
| 7,931,997 | B2 | 4/2011 | Gottmann et al. |
| 7,947,155 | B1 | 5/2011 | Green et al. |
| 8,012,453 | B2 | 9/2011 | Saxena |
| 8,022,260 | B2 | 9/2011 | O'Connor et al. |
| 8,070,835 | B2 | 12/2011 | McAlister |
| 8,071,246 | B2 | 12/2011 | Mitlitsky et al. |
| 8,211,583 | B2 | 7/2012 | Weingaertner et al. |
| 8,212,088 | B2 | 7/2012 | Olah et al. |
| 8,226,798 | B2 | 7/2012 | van Aardt et al. |
| 8,318,997 | B2 | 11/2012 | McAlister |
| 8,784,095 | B2 | 7/2014 | McAlister |
| 8,912,239 | B2 | 12/2014 | McAlister |
| 8,916,735 | B2 | 12/2014 | McAlister |
| 8,975,458 | B2 | 3/2015 | McAlister |
| 8,980,416 | B2 | 3/2015 | McAlister |
| 2002/0077401 | A1 | 6/2002 | Chaudhary et al. |
| 2004/0253168 | A1 | 12/2004 | Chu |
| 2006/0057443 | A1 | 3/2006 | Cooper |
| 2006/0280669 | A1 | 12/2006 | Jones |
| 2007/0056842 | A1 | 3/2007 | Roychowdhury |
| 2007/0231234 | A1 | 10/2007 | Ravi et al. |
| 2008/0233029 | A1 | 9/2008 | Fan et al. |
| 2009/0007484 | A1 | 1/2009 | Smith |
| 2009/0060805 | A1 | 3/2009 | Muradov |
| 2009/0183430 | A1 | 7/2009 | Schubert et al. |
| 2009/0208784 | A1 | 8/2009 | Perry et al. |
| 2009/0208785 | A1 | 8/2009 | McElroy |
| 2009/0246596 | A1 | 10/2009 | Sridhar et al. |
| 2009/0273240 | A1 | 11/2009 | Gurunathan et al. |
| 2009/0291346 | A1 | 11/2009 | Hickey et al. |
| 2010/0275823 | A1 | 11/2010 | Pahls |
| 2010/0298450 | A1 | 11/2010 | Datta et al. |
| 2011/0036320 | A1 | 2/2011 | Peret |
| 2011/0070510 | A1 | 3/2011 | McAlister |
| 2011/0120137 | A1 | 5/2011 | Ennis |
| 2011/0180385 | A1* | 7/2011 | Imholt ............... 204/157.15 |
| 2011/0226988 | A1 | 9/2011 | McAlister |
| 2012/0094198 | A1 | 4/2012 | Chandran |
| 2013/0101808 | A1 | 4/2013 | McAlister |
| 2013/0205647 | A1 | 8/2013 | McAlister |
| 2014/0130756 | A1 | 5/2014 | McAlister |
| 2014/0342417 | A1 | 11/2014 | McAlister |
| 2014/0356744 | A1 | 12/2014 | McAlister |
| 2015/0053161 | A1 | 2/2015 | McAlister |
| 2015/0110683 | A1 | 4/2015 | McAlister |

FOREIGN PATENT DOCUMENTS

| | | |
|---|---|---|
| JP | 2010031187 A | 2/2010 |
| WO | WO-2005021474 A1 | 3/2005 |
| WO | 2006095146 A1 | 9/2006 |
| WO | WO-2007122498 A2 | 11/2007 |
| WO | WO-2009-002191 A2 | 12/2008 |
| WO | WO-2011031752 A2 | 3/2011 |
| WO | WO-2011100695 A2 | 8/2011 |

OTHER PUBLICATIONS

"NETL: What Is Carbon Sequestration?" US Department of Energy—National Energy Technology Laboratory. Accessed: Aug. 30, 2009. <http://www.netl.doe.gov/technologies/carbon_swq/FAQs/carbon-seq.html>.

"US EPA—Carbon Sequestration in Agriculture and Forestry: Frequently Asked Questions." US Environmental Protection Agency. Published: Oct. 19, 2006. Accessed: Aug. 30, 2009. <http://www.epa.gov/sequestration/faq.html>.

Colls, Alison. "Carbon Sequestration." Environmental Change Institute. Accessed: Aug. 30, 2009. <http://climatex.org/articles/climate-change-info/carbon-sequestration/>. pp. 1-4.

Richard, Michael Graham. "Important! Why Carbon Sequestration Won't Save Us." TreeHugger. Published: Jul. 31, 2006. <http://treehugger.com/files/2006/07/carbon_sequestration.php>. pp. 1-6.

Salleh, Anna. "Urea 'Climate Solution' May Backfire." ABC.net.au. Published: Nov. 9, 2007. Accessed: Aug. 30, 2009. <http://www.abc.net.au/science/articles/2007/11/09/2085584.htm>. pp. 1-3.

International Search Report and Written Opinion for Application No. PCT/US2015/033347, mailed Aug. 28, 2015; Applicant: McAlister Technologies, LLC; 9 pages.

International Search Report and Written Opinion for Application No. PCT/US2015/033349, mailed Aug. 28, 2015; Applicant: McAlister Technologies, LLC; 8 pages.

* cited by examiner

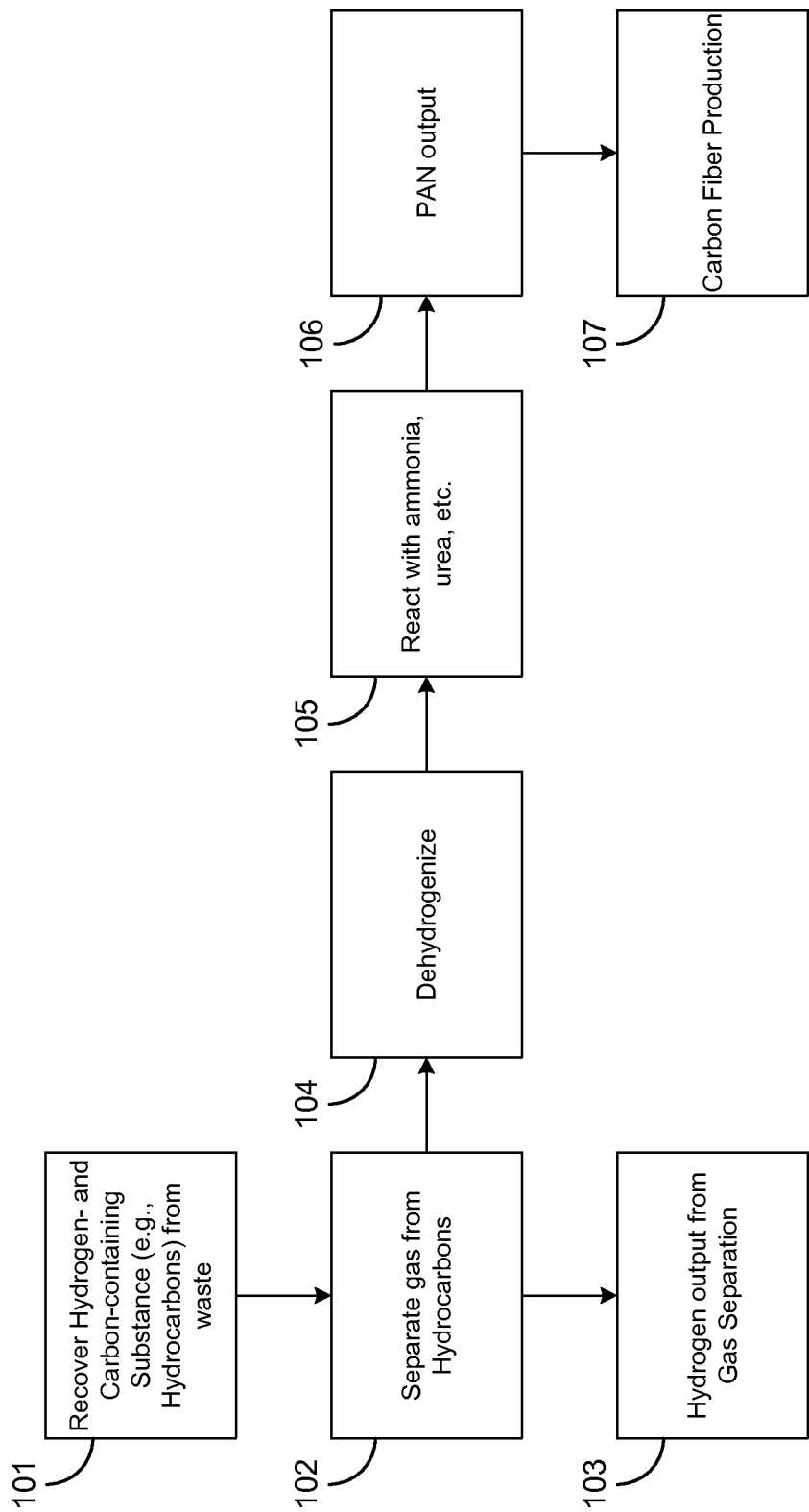

CARBON-BASED MANUFACTURING OF FIBER AND GRAPHENE MATERIALS

CROSS REFERENCE TO RELATED APPLICATION(S)

This patent document claims the benefit of priority of U.S. Provisional Patent Application No. 61/801,522, entitled "ADVANCED CARBON-BASED MANUFACTURING OF FIBER AND GRAPHENE FOR ANG STORAGE TANKS" and filed on Mar. 15, 2013. The entire content of the aforementioned patent application is incorporated by reference as part of the disclosure of this patent document.

TECHNICAL FIELD

This patent document relates to systems, devices and processes that use nanoscale materials for producing carbon nanofibers.

BACKGROUND

Nanotechnology provides techniques or processes for fabricating structures, devices, and systems with features at a molecular or atomic scale, e.g., structures in a range of one to hundreds of nanometers in some applications. For example, nano-scale devices can be configured to sizes about one hundred to ten thousand times smaller than living cells, e.g., similar in size compared to some large biological molecules that make up such cells. Nanoscale materials are used to create a nanostructure, nanodevice, or a nanosystem, which can exhibit various unique properties which are not present in the same materials scaled at larger dimensions, and such unique characteristics can be exploited for a wide range of applications.

SUMMARY

In one aspect, a method to fabricate an acryl-modified polymer includes obtaining a hydrocarbon substance or other substance containing hydrogen and carbon from one or both of a waste stream or natural gas, separating gases from the hydrocarbon substance to form hydrogen gas and a carbonaceous gas including one or more of methane, butane, or ethane, dehydrogenating the carbonaceous gas by adding heat to form a dehydrogenated carbon material, and reacting the dehydrogenated carbon material with a nitrogen material including one of ammonia or urea to produce polyacrylonitrile (PAN).

BRIEF DESCRIPTION OF THE DRAWINGS

FIG. 1 shows a diagram of an exemplary method to produce an intermediary substance as a precursor (e.g., such as an olefin derivative or polyacrylonitrile (PAN)) to subsequent carbon fiber and/or graphene production.

DETAILED DESCRIPTION

Conventional carbon-based manufacturing is too expensive to drive economic development in key industries such as transportation, energy storage, and renewable energy harvesting. The paradigm that dominates U.S. power generation, transportation, and manufacturing sectors and drives the U.S. economy is founded upon burning fossil hydrocarbons for energy. The concomitant problems of this paradigm are large, well-documented, and trending toward crisis: 1) Carbon wastes produced by hydrocarbon combustion pollute the air and contribute massively to the greenhouse gas (GHG) impact on climate; 2) Petroleum hydrocarbons are finite resources subject to depletion, international commodity price manipulations, and harmful trade deficits; 3) Carbon in suitable feedstocks for production of carbon fiber is too costly for greater applications in transportation products that would reduce fuel consumption. This paradigm also involves large shipping and processing costs and generates wastes that must be managed at high cost.

The disclosed methods, systems, and devices describe technology to establish a new paradigm for disruptive innovation in energy and materials production, e.g., including the separation of hydrocarbons into hydrogen and carbon resources first and, in doing so, convert waste into value (e.g., Hydrogen=fuel and energy storage; Carbon=abundant material resource). This carbon resource will create new low-cost fiber (applicable to numerous uses) and graphene (a new form of carbon that is exceptionally thin, light weight, and very strong).

The disclosed technology can be applied to cutting the cost of carbon fiber manufacturing in half by reducing the cost of the precursor such as selected pitches, polyolefins, polyacrylonitrile (PAN) and other intermediates. The disclosed technology includes anaerobic electrolysis system (AES) that convert at least twice the amount of carbon from organic feedstock into a precursor such as PAN, e.g., as compared to conventional means. Also, for example, hydrogen is utilized for process energy requirements and to generate PAN without pollution.

The disclosed technology can also be applied to new manufacturing methods using graphene to produce storage tanks for gaseous and liquid fuels. For example, current tests indicate that the storage density of methane and hydrogen can be increased by more than four times in the same tank volume, dramatically extending the distance that can be traveled by vehicles using these fuels. Graphene includes carbon atoms jointed together in a flat lattice, e.g., similar to a honeycomb structure but only one atom thick for each graphene crystal layer. This lattice provides massive new surface area for adsorption of the fuel. In chemistry, adsorption is the attraction and holding of molecules of a substance to a surface liquid or solid causing a high concentration of the substance to be achieved.

The disclosed technology can also be applied to methods using both (fossil fuel) natural gas and (renewable) biomethane feedstocks for environmentally friendly purposes. For example, natural gas is available in most urban settings and along natural gas pipeline corridors in rural settings. Exemplary environmentally friendly processes applying the disclosed technology include increasing the value of the natural gas commodity when (1) hydrogen is separated and liberated for use as a clean fuel and (2) carbon is co-harvested for manufacturing precursor or fiber while (3) avoiding the substantial amounts of cost for carbon footprint damages and clean-up. Development of both carbon fiber and graphene production may interchangeably utilize natural gas and biomethane feedstocks. For example, in certain locations, renewable feedstock (e.g., biomethane) is a preferred resource because locally available and constantly replenished from sources such as biomass and biowaste materials that can be obtained at little to no cost, while avoiding handling costs and fuel consumption for shipping from distant sources. Exemplary anaerobic electrolysis systems can be used to maximize production of methane from the feedstock. Hydrogen and carbon can be co-produced in the biowaste electrolysis process.

Regardless of the feedstock source, for example, hydrogen is produced in the generation of propylene from methane, ethane or propane; and such hydrogen can be combined with nitrogen from ambient air to produce ammonia for PAN synthesis. Hydrogen from these process steps provides clean energy for the system, avoiding pollution and greenhouse gas (GHG) emissions.

Such exemplary systems can change the materials cycle process at essential points, e.g., waste recycling, feedstock preparation, carbon sequestration, power generation, and materials fabrication. Such exemplary systems can cascade outputs of each stage into subsequent operations that synergistically incorporate previously wasted substances into values. In contrast to conventional steam reforming or sequestration techniques, for example, the disclosed systems can utilize captured carbon donors in the subsequent carbon fiber production process. This method uses feedstock as both fuel and source material and creates values from chemical by-products (e.g., sulfur and ash). The technology's economic impact can also provide a model for distributed energy and materials production from local feedstocks combined with advanced manufacturing methods to produce, e.g., 1) High quality carbon fiber and graphene at a cost that significantly energizes industry; 2) Non-polluting, off-or-on-the-grid manufacturing; 3) New high-quality local jobs in manufacturing; and 4) A model that can be used to establish regional carbon-based industrial parks that exploit and harness the value of local wastes. It is also noted that the disclosed technology (e.g., devices, systems, and methods) can be utilized to convert vast permafrost and oceanic methane hydrate deposits into large quantities of energy and carbon fiber. Harvesting a pollutant and converting the material into financial benefit also brings with it significant reduction in the threat of pervasive harmful greenhouse gas releases into the global atmosphere—from two of the most seriously threatening mass-scale drivers of climate change.

Inexpensive mass production of carbon fiber and graphene from renewable and/or fossil fuel feedstocks will make carbon fiber reinforcement cost-effective for manufacturing, e.g., including, but not limited to: 1) Storage tanks to enable international adoption of methane and hydrogen as fuels for transportation, power generation, and heavy equipment; 2) Renewable energy conversion equipment; 3) Safer automotive components that have lower curb weight and inertia (to increase fuel efficiency), increased strength and safety, corrosion resistance and higher durability; 4) Consumer durable goods; and 5) New nanoscale products. In addition, the disclosed technology provides a model for "minus-emissions manufacturing" to actually clean the air as a net outcome.

Risk factors associated with conventional carbon fiber manufacturing include eye and skin irritation from carbon dust and exposure to volatile organic outgassing for technicians in the process, along with pollution and greenhouse gas emissions for the environment. The disclosed methods can control and redirect the waste products at each step in the process.

In one aspect, the disclosed technology includes methods to fabricate precursors such as PAN intermediaries to carbon fiber and/or graphene fabrications. An exemplary representative method to fabricate an acryl-modified polymer is described. The method includes a process to obtain a hydrocarbon substance from one or both of a waste stream or fossil source such as natural gas. The method includes a process to separate gases from the hydrocarbon substance to form hydrogen gas and a carbonaceous gas, e.g., including one or more of methane, ethane, propane, butane, etc. The method includes a process to dehydrogenate the carbonaceous gas by adding heat to form an intermediate or dehydrogenated carbon material. The method includes a process to react the intermediate or dehydrogenated carbon material with a nitrogen material, e.g., including ammonia and/or urea, to produce polyacrylonitrile (PAN).

Implementations of the method can include one or more of the following exemplary features. In some implementations, for example, the process to react the dehydrogenated carbon material with the nitrogen material can further include producing other nitrile substances and paraffin substances. In some implementations, for example, adding the heat in the dehydrogenation process can include applying the carbonaceous gas across an array of heat sources in a controlled process atmosphere such as provided by a vacuum furnace. In some implementations, the method can further include a process to draw the produced PAN to produce carbon fibers, in which the drawing causes nitrogen and hydrogen releases. For example, the produced carbon fibers can be configured or further processed to include a flat, twisted or fuzzy fiber structure. In some implementations, for example, the drawing process can include forming an internal nano or microfiber within the produced carbon fibers. In some implementations, the method can further include a process to form or promote adhesive bonds to the internal nano or microfiber of the produced carbon fibers such as by chemically or radiatively cross-linking.

FIG. 1 shows a diagram of an exemplary method to produce a PAN intermediary substances and subsequent carbon fiber and/or graphene production. The method includes a process 101 to recover waste (e.g., hydrocarbon waste) from waste streams. For example, the waste streams can include, but is not limited to, industrial waste streams, agricultural waste streams, waste streams produced during electrolysis by electrolyzer systems, etc. The method includes a process 102 to separate gas from the recovered waste (e.g., hydrocarbon waste), e.g., forming hydrogen gas and carbonaceous gas (e.g., including one or more of methane, ethane, propane, butane, etc.) In some implementations of the method, for example, the method includes a process 103 to collect the separated gas (e.g. collect hydrogen as an output of the gas separation process). The method includes a process 104 to dehydrogenize the separated constituents of the gas separation process (e.g., dehydrogenize the carbonaceous gas). The method includes a process 105 to chemically react the one or more of the separated gases (e.g., carbonaceous gas and/or hydrogen gas) with a nitrogenous material (e.g., including activated nitrogen, ammonia and/or urea) to produce an intermediary polyacrylonitrile (PAN) product. The method includes a process 106 to collect the produced intermediary PAN product, e.g., which can be outputted to another system or process. In some implementations of the method, the method further includes a process 107 to use the produced intermediary PAN product to produce a carbon fiber and/or a graphene material.

In some implementations, for example, the process 101 to recover waste and/or other processes of the exemplary method can include various techniques and systems as described in: U.S. Pat. No. 8,318,997 issued on Nov. 27, 2012 and titled "CARBON-BASED DURABLE GOODS AND RENEWABLE FUEL FROM BIOMASS WASTE DISSOCIATION", U.S. patent application Ser. No. 13/584,733 filed Aug. 13, 2012, now U.S. Pat. No. 8,916,735, and titled "CARBON-BASED DURABLE GOODS AND RENEWABLE FUEL FROM BIOMASS WASTE DISSOCIATION FOR TRANSPORTATION AND STORAGE", U.S. Patent Publication No. 2011-0201698 published on Aug. 18, 2011, now U.S. Pat. No. 8,912,239, and titled "CARBON RECY- CLING AND REINVESTMENT USING THERMOCHEMICAL REGENERATION", U.S. Patent Publication No. US 2013-0205647 A1 published on Aug. 15, 2013, now U.S. Pat. No. 9,193,925, and titled "RECYCLING AND REINVESTMENT OF CARBON FROM AGRICULTURAL PROCESSES FOR RENEWABLE FUEL AND MATERIALS USING THERMOCHEMICAL REGENERATION", U.S. Patent Publication No. 2011-0207062 published on Aug. 25, 2011, now U.S. Pat. No. 8,784,095, and titled "OXYGENATED FUEL"; all of the aforementioned patent documents are incorporated by reference in their entirety as part of the disclosure of this patent document.

As shown in FIG. 1, recovered hydrocarbons from waste streams or a fossil resource such as natural gas can be used to create PAN intermediaries. As shown in FIG. 1, the method includes separating the gases. For example, methane, ethane, propane, butane, can be separated and used to create PAN intermediaries. As shown in FIG. 1, the method includes dehydrogenizing the gas(es), e.g., by adding heat or other forms of energy. In some implementation, the method includes polymerization of the separated gas(es), e.g., such as polymerization of methane to form ethane, ethylene, propane, and/or propylene including modifying the intermediate process gases by adding or utilizing heat or other forms of energy. For example, this energy may be utilized or added across an array in a vacuum furnace. In exemplary instances where ethane is separated, a dehydrogenizing step would convert the hydrocarbon to ethane, ethylene, propane or propylene etc. As shown in FIG. 1, the dehydrogenized material can be incorporated as a co-polymer or reacted with a substance, e.g., such as ammonia and/or urea, to create an intermediate such as acryl-modified polymer, e.g., such as polyacrylonitrile or other PAN intermediaries, nitriles, and paraffins. The precursor such as various pitch compositions, polyethylene, polypropylene, polybutylene, or copolymers of such formulations or PAN-characterized intermediaries can then be drawn into fibers.

Methods to produce carbon fibers and/or graphene materials using the produced polyacrylonitrile (e.g., PAN intermediaries) can include producing particular fibers tailored to particular designs that depend on desired functional uses and characteristics. For example, such precursors including PAN intermediaries can be drawn into branch fibers if more friction is desired. In some implementations, for example, fuzzy fibers can be produced and configured to include nano or macro filament growths or deposits that increase bonding area or friction including Velcro-like hook and loop fasteners and/or can have a chemical latch created or include adhesive bonding. In some implementations, for example, flat fibers, or nanotape, e.g., for increasing packing efficiency, are produced. Such exemplary fibers can be drawn and modified to produce higher performance reinforcement components. This provides more stability, internal friction, and/or adhesive strength to the macrofiber or composite application. Strength improvements may be provided by adhesive bonds that include chemical or radiative cross linking. Optionally, for example, the method can include adding an activated carbon such as a multilayered architectural construct of boron nitride and/or graphene that adsorptively contains and presents one or more suitable reactants such as a peroxide (e.g., methyl, ethyl, ketones) as an exemplary method for creating adhesive or chemical compounding bonds.

In other exemplary embodiments of the disclosed methods, the method to produce carbon fibers and/or graphene materials can include adding iron to a carbon solution to allow for seeding of the carbon to catalytically initiate and produce the fiber or another form of architectural construct. Rejecting heat or process cooling may also be provided to produce graphene or graphitic forms or fibers that are precipitated from suitable organic or metal solutions. Management of thermal gradients allows control over the purification and orientation of the chemical bond structure of the fiber. Fibers can then be surface treated with a reactant such as a gaseous silicon contributor, e.g., such as a silane to form silicon carbide.

In another exemplary embodiment of the disclosed methods, a nanotape or flat fiber can be produced using other precursor substances and forms, e.g., such as glass or glass-ceramic filaments as precursors. This fiber can be coated with carbon such as diamond like carbon (DLC), and the bonds may be strengthened or oriented by pulling in tension as such deposition occurs. An exemplary thermoplastic or thermoset substance such as epoxy that is typically utilized to form a composite with the fiber can be reduced or eliminated due to the form factor, high strength, and linking or friction enhancing characteristics of the resulting fiber.

In some implementations, for example, the disclosed technology includes methods to produce ceramic characterized compositions by 1) Melting local rocks, gravel, or sand; 2) Adjusting melt chemistry by hot refining and additions; 3) Producing press molded, extruded profiles, and/or blowing one or more melt streams into fibers; and 4) Heat treating to ceramic-glass products to adjust optical, physical, and composite strength outcomes.

The glass crystal fibers can be woven, matted, or incorporated as cables or composites in the architectural products for applications ranging from vertical farms to clathrate harvesting systems from permafrost to ocean deposits. For example, filaments, fiber and thin ribbon can be made from heated and fused minerals or "rocks" by the following exemplary steps. In a first step, for example, calcining can be performed to release, oxidize or drive out sulfur compounds, $CO_2$, and water vapor and other undesirable contaminates as may be provided by a heated oxidizing atmosphere. In a second step, for example, melt refinement to adjust the chemistry and viscosity by various suitable arrangements for radiant, resistance and/or induction heating can be performed. In a third step, for example, molten filaments are formed by pouring, expelling fused liquid through a spinner die, or by valve operation, such as opening the bottom bung out of the production apparatus (e.g., crucible) that has been refined to have a suitable molten rock formula in it. In a fourth step, for example, conditioning with a gas can be performed. For example, conditioning events can include blowing gas across, in some instances perpendicular, and in other instances not perpendicular, which depends on the desired outcome. For example, conditioning events can include monitoring and/or applying surface tension of the fiber as it is formed over a mandril with flow forming features. For example, the low density and flexible filaments, fibers, and/or strip that are produced have properties and characteristics such as fire-resistance or fire-proof qualities, chemical inertness, and may have thermal and or electrical resistance that are enhanced or produced by coatings such as DLC or conductive carbon allotropes as may be needed. Exemplary desired outcomes can include variable pressure and impingement angles of conditioning gas blows to produce short or scrunched fibers that may be accumulated into wool like or cotton like assemblies; or conditioning gas blows may be of suitable temperature, pressure and chemical characteristics to produce long straight fibers that may be combed and/or woven into tapes or fabrics; and other conditioning gas blows may be made in conjunction with tooling to produce profiles, such as one or more temperature regulated rollers including one or more textured pinch rolls to create flat or textured ribbon that is flexible and ductile. For example, gas supplies may provide a reactant to produce a conversion coating and may be accomplished on substrate that is in tension to produce high strength and flexibility along with chemical and fatigue resistance. For example, conditioning gases can be carbon donors such as methane, ethane, propane, acetylene nitrogen, ammonia, including temperature controlled process gases. In many instances, for example, the desired outcomes utilize phase diagrams for choosing reactants, substrate constituents, and process parameters.

In some aspects, the disclosed technology includes methods to produce fuzzy fibers. The method includes a process to spin, pull, or draw a polymer material (e.g., polyethylene) into fiber in a suitable process to dehydrogenate the tensioned fiber to produce a carbon graphite fiber. Subsequently a process to deposit architectural constructs such as silicon carbide, silicon nitride and/or boron nitride or carbon nanotubes (e.g., single walled or multi walled nanotubes) on the tensioned carbon fiber produces a fuzzy fiber composition. For example, heat from the drawing process can provide substantial amounts of energy to dissociate donor substances and grow suitable fuzzy forms on the drawn fiber. Illustratively, for example, hydrocarbons and/or other reactants, e.g., such as selections of various chemical vapor deposited poly(p-xylylene) polymers, are deposited and heat treated to form architectural constructs such as nanotube structures to produce the fuzzy carbon fiber configuration. Exemplary architectural constructs are described in the U.S. Patent documents: U.S. Patent Publication US2011/0206915A1 published on Mar. 17, 2015, now U.S. Pat. No. 8,980,416, entitled "ARCHITECTURAL CONSTRUCT HAVING FOR EXAMPLE A PLURALITY ARCHITECTURAL CRYSTALS", and U.S. Patent Publication US2013/0101808A1 published Apr. 25, 2013, entitled "ARCHITECTURAL CONSTRUCT HAVING A PLURALITY OF IMPLEMENTATIONS", both of which are incorporated by reference in their entirety as part of the disclosure in this patent document. In some instances, for example, the produced fuzzy carbon fiber appears 'black' in the visible, UV, and infrared spectra, where the fuzzy carbon fiber absorbs radiation from these spectra (e.g., large frequency radiation absorption).

In some implementations, the method can use polyolefin polymers to produce long, fibers, e.g., that may have reduced tensile strength compared to PAN sourced fibers but such fiber production output can be two or more times (e.g., 2× to 6×) that of conventional methods using PAN feedstocks. In other instances lower strength PAN produced fibers may be utilized to produce fuzzy fibers. Subsequently the same or greater properties compared to high strength composites of PAN produced fibers may be provided by converting the lower strength fibers to fuzzy fibers.

The method can include multiple preliminary processes to produce a polymer used in the production of the fuzzy fibers. A preliminary process of the method can include producing ethane or ethylene from methane that is polymerized. A preliminary process of the method can include recovering the hydrogen produced by forming ethylene, and polymerizing the ethylene to polyethylene. Such hydrogen may be utilized as an energy carrier or to produce other valuable products such as ammonia, urea, or other compounds including liquid fuels such as fuel alcohols or formic acid by producing liquid compounds with nitrogen and/or carbon dioxide from sources such as the atmosphere.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method to fabricate carbon fibers or graphene, comprising the steps of:
   obtaining a precursor material from a hydrocarbon substance from one or both of a waste stream or a fossil fuel source, wherein obtaining the precursor material comprises:
      separating gases from the hydrocarbon substance to form hydrogen gas and a carbonaceous gas;
      dehydrogenating the separated carbonaceous gas by adding heat to form a dehydrogenated carbon material; and
      reacting the dehydrogenated carbon material with a nitrogenous material to produce the precursor material,
   processing the precursor material to produce carbon fibers, wherein processing the precursor material causes nitrogen and hydrogen to be released.

2. The method as in claim 1, wherein the produced carbon fibers include a fuzzy fiber structure, a twisted fiber or a flat fiber structure.

3. The method as in claim 1, wherein processing the precursor material includes forming an internal nanofiber or a microfiber within the produced carbon fibers.

4. The method as in claim 3, further comprising:
   forming adhesive bonds to the internal nanofiber or microfiber by chemically or radiatively cross-linking.

5. The method as in claim 1, wherein the separated carbonaceous gas includes one or more of methane, ethane, propane, or butane.

6. The method as in claim 1, wherein the nitrogenous material includes one of activated nitrogen, ammonia, or urea.

7. The method as in claim 1, wherein the produced precursor includes polyacrylonitrile (PAN).

8. The method as in claim 1, wherein the produced precursor includes a polyolefin.

9. The method as in claim 1, wherein the produced precursor includes one or more of polyethylene, polypropylene, or polybutylene.

10. The method as in claim 1, wherein the reacting further produces other nitrile substances or paraffinic substances.

11. The method as in claim 1, wherein the adding the heat includes applying the carbonaceous gas across an array of heat sources in a controlled atmosphere by a vacuum furnace.

12. A method to produce a fuzzy carbon fiber composition comprising the steps of:
   forming a precursor into a tensioned fiber;
   dehydrogenating the tensioned fiber to produce a carbon graphite fiber;
   developing architectural constructs on the tensioned carbon fiber to produce a fuzzy fiber composition.

13. The method as in claim 12 wherein the step of developing includes depositing architectural constructs on the tensioned carbon fiber.

14. The method as in claim 12 wherein the step of developing includes forming architectural constructs on the tensioned carbon fiber.

15. The method as in claim 12 wherein, the architectural constructs include one or more of silicon carbide, silicon nitride, boron nitride, single walled carbon nanotubes and multi walled carbon nanotubes.

16. The method as in claim 12, wherein the forming step comprises at least one of spinning, pulling, and drawing the precursor.

17. The method as in claim 13 wherein, the step of depositing architectural constructs comprises of adding iron to a carbon solution to initiate and produce the architectural construct.

\* \* \* \* \*